United States Patent
Ger (10) Patent No.: US 10,464,431 B2
(45) Date of Patent: Nov. 5, 2019

(54) ELECTRIC VEHICLE, POWER SUPPLY STATION, AND POWER MAINTAINING METHOD FOR ELECTRIC VEHICLE

(71) Applicant: Chih-Chan Ger, New Taipei (TW)

(72) Inventor: Chih-Chan Ger, New Taipei (TW)

( * ) Notice: Subject to any disclaimer, the term of this patent is extended or adjusted under 35 U.S.C. 154(b) by 0 days.

(21) Appl. No.: 15/505,687

(22) PCT Filed: Aug. 21, 2015

(86) PCT No.: PCT/CN2015/087776
§ 371 (c)(1),
(2) Date: Feb. 22, 2017

(87) PCT Pub. No.: WO2016/034050
PCT Pub. Date: Mar. 10, 2016

(65) Prior Publication Data
US 2017/0253138 A1   Sep. 7, 2017

(30) Foreign Application Priority Data

Sep. 2, 2014   (CN) .......................... 2014 1 0442887

(51) Int. Cl.
*B60R 16/04*     (2006.01)
*B60L 11/18*     (2006.01)
(Continued)

(52) U.S. Cl.
CPC ............ *B60L 11/1822* (2013.01); *B60K 1/04* (2013.01); *B60S 5/06* (2013.01); *B65G 15/22* (2013.01)

(58) Field of Classification Search
CPC .... B60S 5/06; B60K 1/04; B60K 1/00; B60K 2001/0472; B60K 2001/0455;
(Continued)

(56) References Cited

U.S. PATENT DOCUMENTS 4,477,764 A * 10/1984 Pollard .................. B60L 1/003
                                                        307/84
5,157,319 A * 10/1992 Klontz ................ B60L 11/1816
                                                        320/108
(Continued)

FOREIGN PATENT DOCUMENTS

CN       101224711 A      7/2008
CN       201766113 U      3/2011
(Continued)

OTHER PUBLICATIONS

International Search Report and Written Opinion for PCT/CN2015/087776 dated Dec. 1, 2015.

*Primary Examiner* — James M Dolak
(74) *Attorney, Agent, or Firm* — McClure, Qualey & Rodack, LLP (57) ABSTRACT

A power maintaining method of electric vehicle includes the following step. In step 01, an energy power is provided by a main battery pack to drive a first electric vehicle (EV) moving to a first power supply station. In step 02, a first swappable battery pack is installed on the first EV at the first power supply station, and the first swappable battery pack is electrically connected to the main battery pack of the first EV so that the main battery pack is charged by the first swappable battery pack. In step 03, the first EV is driven to a second power supply station from the first power supply station. In step 04, the first swappable battery pack is uninstalled from the first EV at the second power supply station. In addition, an electric vehicle and a power supply station is disclosed in the present application.

8 Claims, 8 Drawing Sheets

(51) Int. Cl.
*B60K 1/04* (2019.01)
*B60S 5/06* (2019.01)
*B65G 15/22* (2006.01)

(58) Field of Classification Search
CPC .... B60K 2001/0461; B60K 2001/0438; B60L 11/1822; B60L 11/1824; B60L 11/1816; B60L 11/1877; B60L 11/18; B60L 11/1879; B60L 11/1838; B60L 11/1809; B60L 11/1851; B60L 11/1864; B60L 11/1868
See application file for complete search history.

(56) References Cited

U.S. PATENT DOCUMENTS

| | | | | |
|---|---|---|---|---|
| 5,542,488 A | * | 8/1996 | Nixon | B60K 1/04 104/34 |
| 5,612,606 A | * | 3/1997 | Guimarin | B60K 1/04 104/34 |
| 5,883,496 A | * | 3/1999 | Esaki | B60L 11/1861 318/139 |
| 6,938,553 B2 | * | 9/2005 | Tamaki | B61C 17/06 104/34 |
| 7,520,355 B2 | * | 4/2009 | Chaney | B60K 1/04 180/68.5 |
| 7,900,728 B2 | * | 3/2011 | Suzuki | B60K 1/04 180/65.29 |
| 8,022,666 B2 | * | 9/2011 | Li | B60L 11/185 104/34 |
| 8,146,694 B2 | * | 4/2012 | Hamidi | B60K 1/04 180/68.5 |
| 8,183,819 B2 | * | 5/2012 | Sugano | B60L 3/003 307/10.1 |
| 8,454,377 B2 | * | 6/2013 | Heichal | B60K 1/04 180/65.1 |
| 8,461,804 B1 | * | 6/2013 | Capizzo | B60K 15/063 104/34 |
| 8,516,687 B2 | * | 8/2013 | Hozumi | B60L 11/1822 187/218 |
| 8,668,037 B2 | * | 3/2014 | Shinde | B62K 5/025 180/60 |
| 8,820,444 B2 | * | 9/2014 | Nguyen | B60L 11/1822 180/65.1 |
| 9,007,020 B2 | * | 4/2015 | Prosser | H02J 7/0054 320/104 |
| 9,123,035 B2 | * | 9/2015 | Penilla | G06Q 20/18 |
| 9,177,306 B2 | * | 11/2015 | Penilla | G06Q 20/18 |
| 9,358,895 B2 | * | 6/2016 | Avganim | B60L 11/1822 |
| 9,381,826 B2 | * | 7/2016 | Wu | B60L 15/209 |
| 9,461,284 B2 | * | 10/2016 | Power | B60L 11/1822 |
| 9,555,715 B2 | * | 1/2017 | Sugano | B60L 1/003 |
| 9,925,882 B2 | * | 3/2018 | Penilla | G06Q 20/18 |
| 9,994,115 B2 | * | 6/2018 | Kang | B65G 25/06 |
| 9,994,237 B2 | * | 6/2018 | Jestin | B60L 3/04 |
| 9,997,753 B2 | * | 6/2018 | Nomura | B60L 11/005 |
| 9,997,758 B2 | * | 6/2018 | Kim | H01M 2/1077 |
| 10,189,360 B2 | * | 1/2019 | Ohtomo | B60L 11/1816 |
| 10,286,794 B2 | * | 5/2019 | Ichikawa | H02J 7/0042 |
| 10,293,698 B2 | * | 5/2019 | Zenner | B60L 53/14 |
| 10,399,447 B2 | * | 9/2019 | Ger | B60L 11/1822 |
| 2003/0209375 A1 | * | 11/2003 | Suzuki | B60K 1/04 180/65.22 |
| 2003/0227275 A1 | * | 12/2003 | Kishi | H01M 10/0525 320/107 |
| 2008/0294283 A1 | * | 11/2008 | Ligrano | B60S 5/06 700/218 |
| 2009/0058355 A1 | * | 3/2009 | Meyer | B60L 11/1822 320/104 |
| 2013/0080254 A1 | * | 3/2013 | Thramann | G06Q 50/06 705/14.57 |

FOREIGN PATENT DOCUMENTS

| | | |
|---|---|---|
| CN | 102133888 A | 7/2011 |
| CN | 102152776 A | 8/2011 |
| CN | 201970973 U | 9/2011 |
| CN | 102529732 A | 7/2012 |

\* cited by examiner

ELECTRIC VEHICLE, POWER SUPPLY STATION, AND POWER MAINTAINING METHOD FOR ELECTRIC VEHICLE

BACKGROUND

1. Technical Field

The disclosure relates to an electric vehicle, a power supply station, and a power maintaining method for providing power to the electric vehicle.

2. Description of Related Art

With gradual rising of environmental protection and energy saving awareness, in the technology field of transport vehicles, the reduction of energy consumption and pollution exhaust emission has always been one of the objectives of endeavor for each vehicle factory; therefore, relevant studies on Hybrid Electric Vehicle (HEV) and Electric Vehicle (EV) with energy saving and carbon reduction efficiency have never stopped. According to the survey of Japan Automobile Research Institute, JARI,FC.EV Center, the energy consumption in the driving of general gasoline engine vehicle is 3 times of electric vehicle, besides, the carbon emission in gasoline engine vehicle (vehicle driving for every kilometer) is 4 times of the electric vehicle (conversion of electrical energy). Therefore, each automobile manufacturer such as Nissan, BMW, Tesla etc. has been producing electric vehicles successively and sell them in the market, despite they have not been popularized, they have been attracting attention from the market gradually.

In the aspect of technology, the biggest challenges faced by electric vehicle are to improve the battery's energy storage capacity and shorten the battery's charging time. In order to facilitate the energy needed by electric vehicle motor, the battery itself must possess the capability to be able to provide the output of large current for a long time, and able to provide instant output of high current. Therefore, the batter capacity must be of a certain level, however, how to charge the electric energy of the battery with such large capacity to be full quickly is the great challenge faced by electric vehicle.

When the battery power is running out, electric vehicle must stop at the place with charging unit (such as at home or charging station) to charge the battery. However, take the electric vehicle currently on sale in the market and that can travel about 150 km when the battery is in full electric energy as the example, currently it takes at least 1.5 hours to charge its battery to be full, even charging the battery up to 80% through quick charge technology still takes about 30 minutes. Also due to the inconvenience in supplementing electric energy, hence certain efforts still need to be made in the aspect of battery for the popularization of electric vehicle.

Therefore, how to prolong the service time of battery used in electric vehicle to maintain the power source of electric vehicle and how to achieve the convenience of use with easy charging are indeed one of the important issues currently, which are also the objectives of the industry to be achieved with efforts.

SUMMARY OF THE INVENTION

In view of the foregoing, the invention is to provide an electric vehicle, a power supply station and a power maintaining method, which can easily maintain the power source of the electric vehicle.

To achieve the above purpose, a power maintaining method of an electric vehicle includes the following steps. Step 01 is providing an energy power by a main battery pack to drive a first electric vehicle moving to a first power supply station. Step 02 is installing a first swappable battery pack with outward appearance different from the main battery pack to the first electric vehicle at the first power supply station, and making electrical connection between the first swappable battery pack and the main battery pack of the first electric vehicle so as to charge the main battery pack by the first swappable battery pack. Step 03 is electrically connecting a first DC charging device to the main battery pack to charge the main battery pack at the same time when installing the first swappable battery pack.

In one embodiment of the invention, the power maintaining method further includes the following steps. Step 04 is driving the first electric vehicle moving to a second power supply station. Step 05 is uninstalling the first swappable battery pack from the swappable battery pack holding space of the first electric vehicle at the second power supply station. Step 06 is installing a second swappable battery pack to the swappable battery pack holding space of the first electric vehicle. Step 07 is electrically connecting a second DC charging device to the main battery pack to charge the main battery pack at the same time when uninstalling the first swappable battery pack.

In one embodiment of the invention, the power maintaining method further includes the following step after step S05. Step 08 is electrically connecting a second DC charging device to the main battery pack to charge the main battery pack at the same time when uninstalling the first swappable battery pack.

In one embodiment of the invention, the power maintaining method further includes the following steps. Step 09 is charging the first swappable battery uninstalled from the first electric vehicle at the second power supply station. Step 10 is installing the first swappable battery already charged to a second electric vehicle, wherein the outward appearance of the first swappable battery is different from the outward appearance of the main battery pack of the second electric vehicle.

In one embodiment of the invention, wherein the first swappable battery pack has a power conversion unit, and the first swappable battery charges the main battery pack of the first electric vehicle through the power conversion unit.

In one embodiment of the invention, wherein the electric current of the first DC charging device for charging the main battery pack is 3 times greater than the nominal capacity of the main battery pack.

In one embodiment of the invention, wherein the first swappable battery pack and the second swappable battery pack have the same outward appearance and the different capacity.

In one embodiment of the invention, wherein the first swappable battery pack has a DC power conversion unit and a plurality of batteries, which are electrically connected to each other, a DC charging device of the second power supply station is electrically connected to the DC power conversion unit to charge the batteries through the DC power conversion unit.

In one embodiment of the invention, wherein the first swappable battery pack has a DC power conversion unit and a plurality of batteries, which are electrically connected to each other, a DC charging device of the second power supply station is electrically connected to the batteries to directly charge the batteries.

Besides, to achieve the above purpose, the invention is to provide an electric vehicle, which has a main electrical connector, a main battery pack, a direct-current (DC) recharge socket, a swappable battery pack holding space, and a first swappable battery pack. The main battery pack is electrically connected to the main electrical connector. The DC recharge socket is electrically connected to the main battery pack, and transmits a first DC power to the main battery pack after receiving it. A first electrical connector is disposed in the swappable battery pack holding space. The first electrical connector is used for electrical connection to the main electrical connector. The first swappable battery pack is placed at the swappable battery pack holding space, and electrically connected to the first electrical connector. The first swappable battery pack provides a second DC power to the main battery pack through the first electrical connector.

In one embodiment of the invention, wherein the first swappable battery pack includes a first housing, a plurality of batteries, a power conversion unit, a first electrical connecting unit. The batteries are contained in the first housing and electrically connected to each other. The power conversion unit is electrically connected to the batteries. The first electrical connecting unit includes a first body and a first terminal. The first body is connected to the first housing. The first terminal is electrically connected to the power conversion unit and partially covered by the first housing. At least two of the first housing, the first body and the first terminal can be relatively moved.

In one embodiment of the invention, wherein the first swappable battery pack includes a second electrical connecting unit, which is electrically connected to the first housing and a second swappable battery pack.

Furthermore, to achieve the above purpose, the invention is to provide a power supply station used for electric vehicle. The power supply station is used for providing an electric vehicle to carry out power maintenance operation. The power supply station at least includes a first swappable battery pack, a swappable battery pack installing and uninstalling device, a DC/AC power conversion device, an AC/DC power conversion device and a DC charging device. The swappable battery pack installing and uninstalling device is used for installing the first swappable battery pack to an electric vehicle, or uninstalling it from the electric vehicle. The AC/DC power conversion device is electrically connected to the first swappable battery pack, and output a first DC power according to a first AC power, so as to provide charging to the first swappable battery pack. The DC/AC power conversion device is electrically connected to the first swappable battery pack and an electric power grid respectively, and converts a second DC power output from the first swappable battery pack into a second AC power to output to such electric power grid. The DC charging device outputs a third DC power to provide charging to a main battery pack of the electric vehicle.

In one embodiment of the invention, wherein the DC charging device is electrically connected to the AC/DC power conversion device, and outputs the third DC power according to the first DC power.

In one embodiment of the invention, the power supply station further includes a DC/DC power conversion device, which s electrically connected to a second swappable battery pack and the DC charging device, and outputs the third DC power according to a fourth DC power output from the second swappable battery pack.

As mentioned above, an electric vehicle, a power supply station and a power maintaining method of the electric vehicle according to the invention are to set a holding space at the electric vehicle to hold the swappable battery pack, and the swappable battery pack charges the main battery pack to ensure that the capacity of main battery pack is within a safety scope, so as to prolong its service time. Electric vehicle can travel to the power supply station to replace the swappable battery pack, at the same time of replacement, the power supply station can carry out basic charging to the main battery pack. Through this, electric vehicle is able to efficiently prolong the power service time, and is easy to maintain its power source.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

In order to make the charging of electric vehicle more convenient, the invention provides an electric vehicle capable of replacing the swappable battery pack, among them, the electric vehicle may include the electric scooter and the electric automobile, here we take the electric automobile as the example for description. Please refer to FIG. 1, an electric vehicle according to the embodiment of the invention includes a main electrical connector 10, a main battery pack 11, a DC recharge socket 12, a swappable battery pack holding space 13 and a first swappable battery pack 14.

Figure 2:
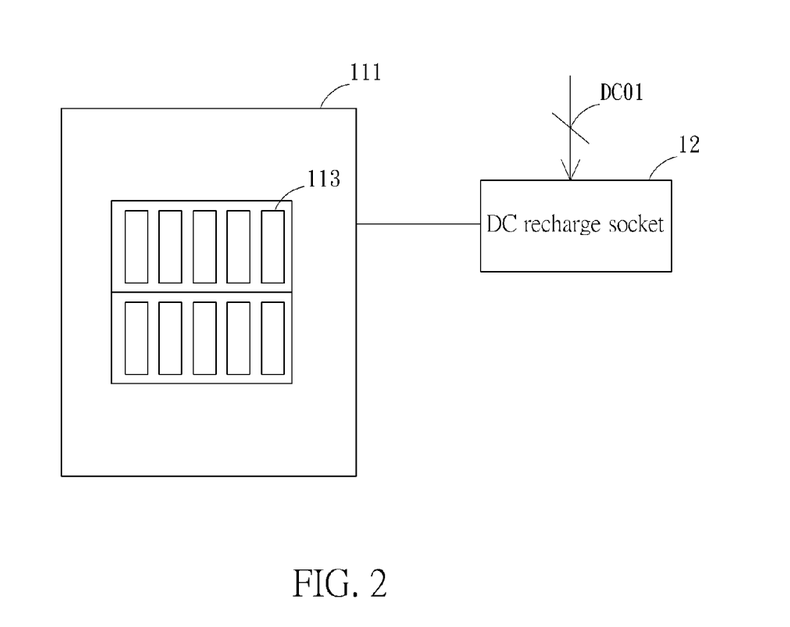
FIG. 2 is a schematic diagram showing a power system of an electric vehicle according to the embodiment of the invention.
Figure 3:
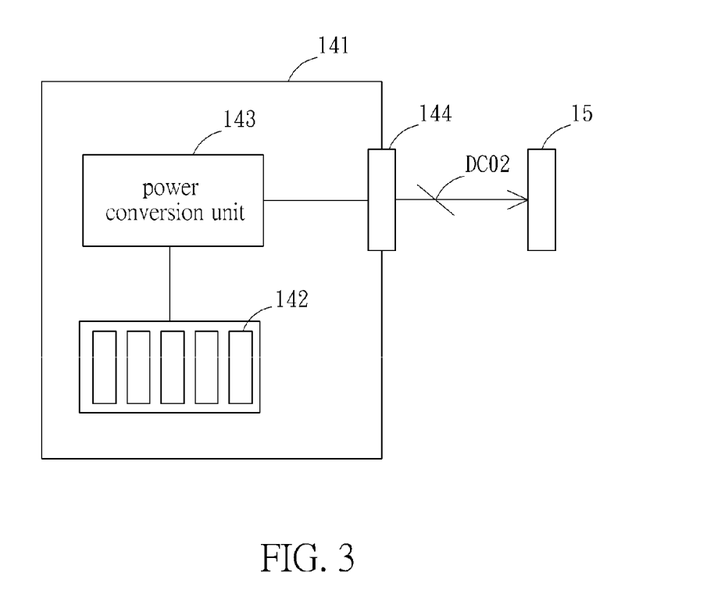
FIG. 3 is a schematic diagram showing a first swappable battery pack according to the embodiment of the invention.

Please also refer to FIG. 2 and FIG. 3 at the same time, the main battery pack 11 at least includes a main housing 111 and a plurality of main batteries 113, which are electrical connected to each other. The main batteries 113 are placed and fixed in the main housing 111. In the embodiment, the main battery pack 11 is disposed in the underbody space among the four wheels of the electric vehicle 1, and is solidly combined with the body structure of the electric vehicle 1 (not shown in the figure). However, the collocating position of main battery pack 11 can be changed according to the design of each vehicle type.

The main electrical connector 10 is electrically connected to the main battery pack 11, so as to provide the power generated from the main battery 113 of the main battery pack 11 to each electrical unit needed of the electric vehicle 1, and further drive it. The DC recharge socket 12 is also electrically connected to the main battery pack 11. The DC recharge socket 12 receives a first DC power DC01 transmitted from external, and transmits the first DC power DC01 to the main battery 113 to charge it. In other words, the main electrical connector 10 includes receiving circuit and output circuit.

Figure 1:
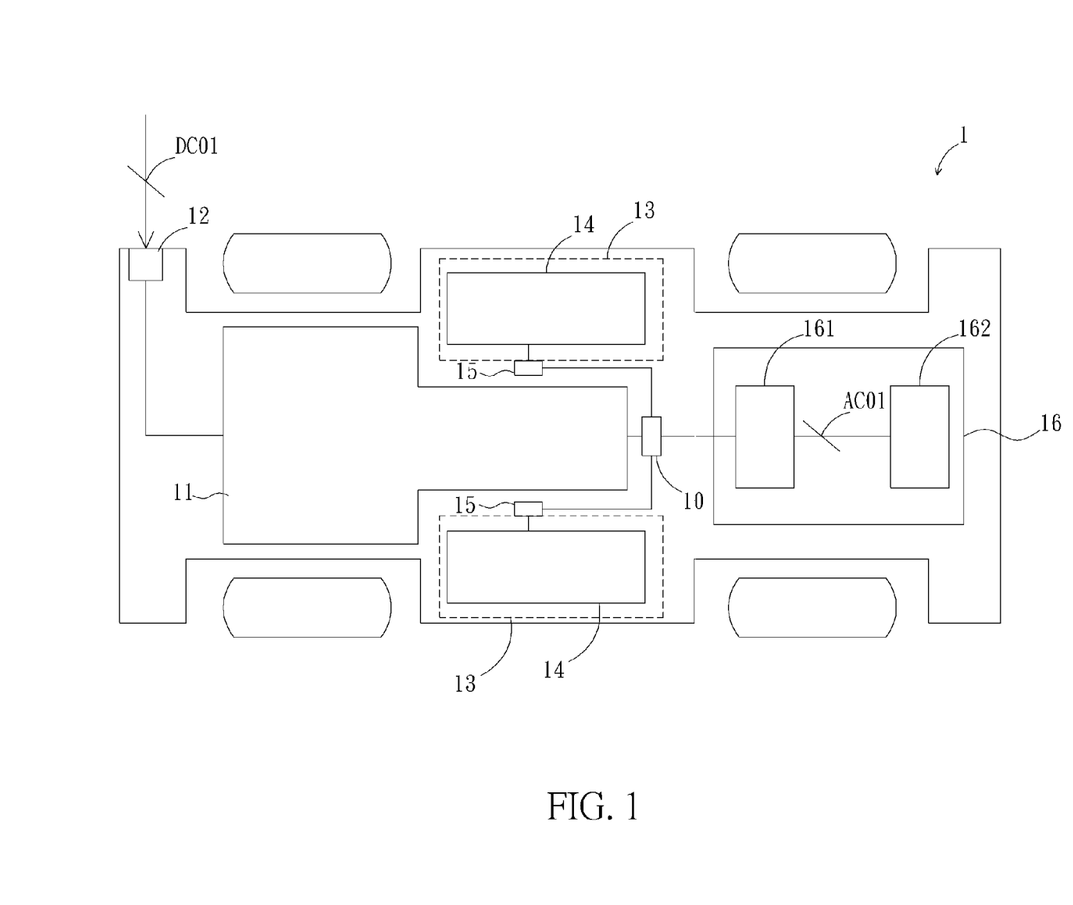
FIG. 1 is schematic diagram showing a part of an electric vehicle according to an embodiment of the invention.

The outward appearance of the first swappable battery pack 14 is different from the outward appearance of the main battery pack 11, and it is disposed in the swappable battery pack holding space 13. It is to be noted, the so-called different outward appearance is meaning that the first swappable battery and the second swappable battery cannot be placed into the same swappable battery pack holding space, or meaning the connecting terminal of the first swappable battery is incompatible with the connecting terminal of the second swappable battery, wherein the connecting terminal is used for communicating to external device. In other words, the connecting terminal of the first swappable battery and the connecting terminal of the second swappable battery have the pins with the different amount or the different configuration.

The swappable battery pack holding space 13 may be located at any open space in the body of the electric vehicle 1, or at the semi-closed space or closed space (not shown in the figure) of a swappable battery cabin exclusively designed for it. The first swappable battery pack 14 is electrically connected to a first electrical connector 15, and the first electrical connector 15 is electrically connected to the main electrical connector 10, with such configuration, a second DC power DC02 output from the first swappable battery pack is transmitted to the main battery pack 11 through the first electrical connector 15 and the main electrical connector 10, and charge the main battery 113 of the main battery pack 11. It is to be noted, the first swappable battery pack charges the main battery pack in anytime such as when the electric vehicle is traveling, stopping or even without startup. Furthermore, the design of the first swappable battery pack 14 quantity can be changed according to actual demand, in the embodiment, it takes the electric vehicle 1 can be equipped with two first swappable battery pack 14 as the example for description, in other words, the electric vehicle 1 has two swappable battery pack holding spaces.

The first swappable battery pack 14 has a first housing 141, a plurality of batteries 142, a power conversion unit 143 and a first electrical connection unit 144. The batteries 142 and the power conversion unit 143 are electrically connected mutually and placed in the first housing 141. The first electrical connection unit 144 is connected to the first housing 141 and goes through the first housing 141 to electrically connect to the power conversion unit 143. Please refer to FIG. 4, the first electrical connection unit 144 has a first body 1441 and a first terminal 1442. The first body 1441 is connected to the first housing 141, and to cover at least part of the first terminal 1442. Specifically speaking, an end of the first terminal 1442 is electrically connected to the power conversion unit 143 by passing the first body 1441 goes through the first housing 141. The other end of the first terminal 1442 is exposed at the first housing 141 and the first body 1441, so as to be electrically connected to the first electrical connector 15.

As shown in FIG. 1, in the embodiment, the electric vehicle 1 also includes a driving module 16, which is electrically connected to the main battery pack 11. The driving module 16 receives the power provided by the main battery pack 11 to drive the electric vehicle 1. The driving module 16 at least includes a DC/AC power conversion unit (Inverter) 161 and an AC motor 162. The DC/AC power conversion unit 161 receives the power provided by the main battery pack 11, and converts it into an AC driving power AC01 to provide to the AC motor 162. The AC motor is driven by the AC driving power AC01, which driving the wheels to make the electric vehicle 1 travel.

It is to be noted, the first swappable battery pack 14 has certain weight (approximately from 50 kg to 150 kg), during the first swappable battery pack 14 is placed into the swappable battery pack holding space 13 and it intends to be electrically connected to the first electrical connection unit 144 and the first electrical connector 15, it needs assistance from certain mechanisms to be mutually connected in a safer and more convenient way.

Figure 4:
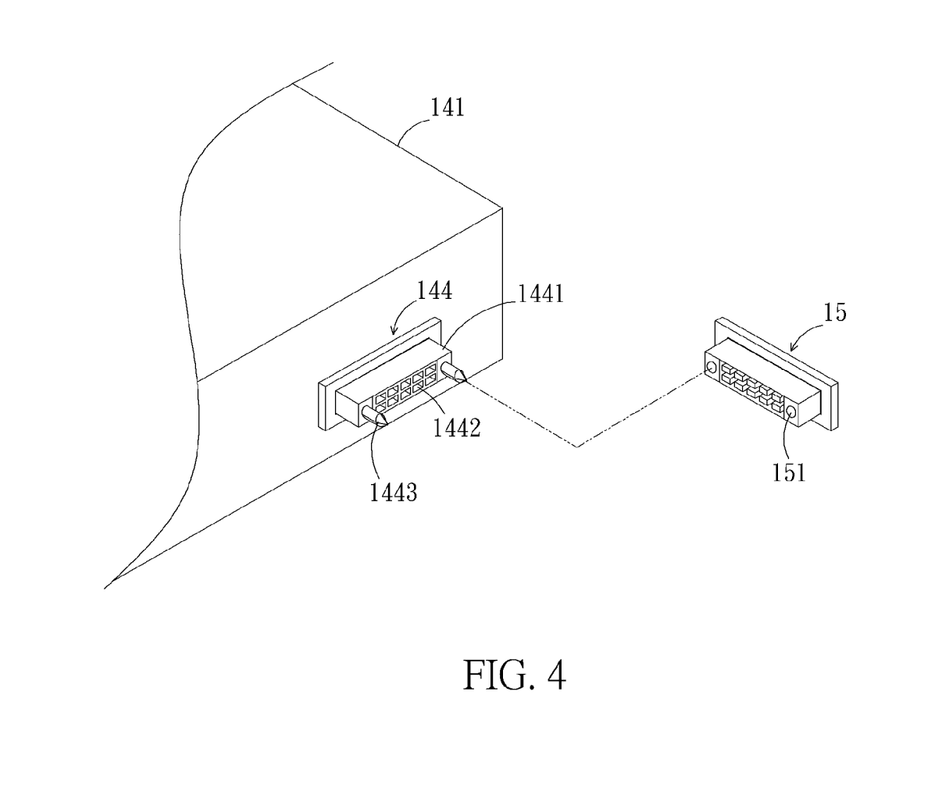
FIG. 4 is a schematic diagram showing a first electrical connection unit and a first electrical connector according to the embodiment of the invention.

Please refer to FIG. 4, the connection mode between the first body 1441 of the first electrical connection unit 144 and the first housing 141 is of floating type, in other words, the first body 1441 and the first terminal 1442 can slightly move from up and down and left and right relative to the first housing 141. Besides, the first electrical connection unit 144 also has two lead terminals 1443, which are disposed at two sides of the first body 1441 respectively. The front end of the lead terminal 1443 is of conform or globular shape, and the first electrical connector 15 also has a hole 151 relative to the lead terminal 1443. When the first swappable battery pack 14 is placed into the swappable battery pack holding space 13, the first electrical connection unit 144 is moved towards the first electrical connector 15, after the lead terminal 1443 has entered into the hole 151 through such movement, the first body 1441 and the first terminal 1442 are combined with the first electrical connector 15. Besides, what also needs to be described is that, when the first swappable battery pack 14 is slightly deviated in the swappable battery pack holding space 13, its position can be adjusted through the lead terminal 1443 and the floating structure.

Furthermore, in order to further ensure the position of the first swappable battery pack 14, the track (not shown in the figure) may also be disposed in the swappable battery pack holding space, so that the first swappable battery pack can move along the track and cannot be deviated easily. Besides, the swappable battery pack holding space 13 may have a fixed structure (not shown in the figure) to make the first swappable battery pack be solidly placed in the swappable battery pack holding space 13, such as the lockup type or clamping type.

In the embodiment, it takes the electric vehicle 1 with two swappable battery pack holding spaces 13 respectively accommodated in the first swappable battery pack 14 as the example, the first swappable battery pack 14 is placed along with the tracks at two sides of vehicle body and then fixed with the clamping mechanism. However, in other embodiments, the swappable battery pack may be set in other spaces according to the different designs of vehicle body.

Figure 5:
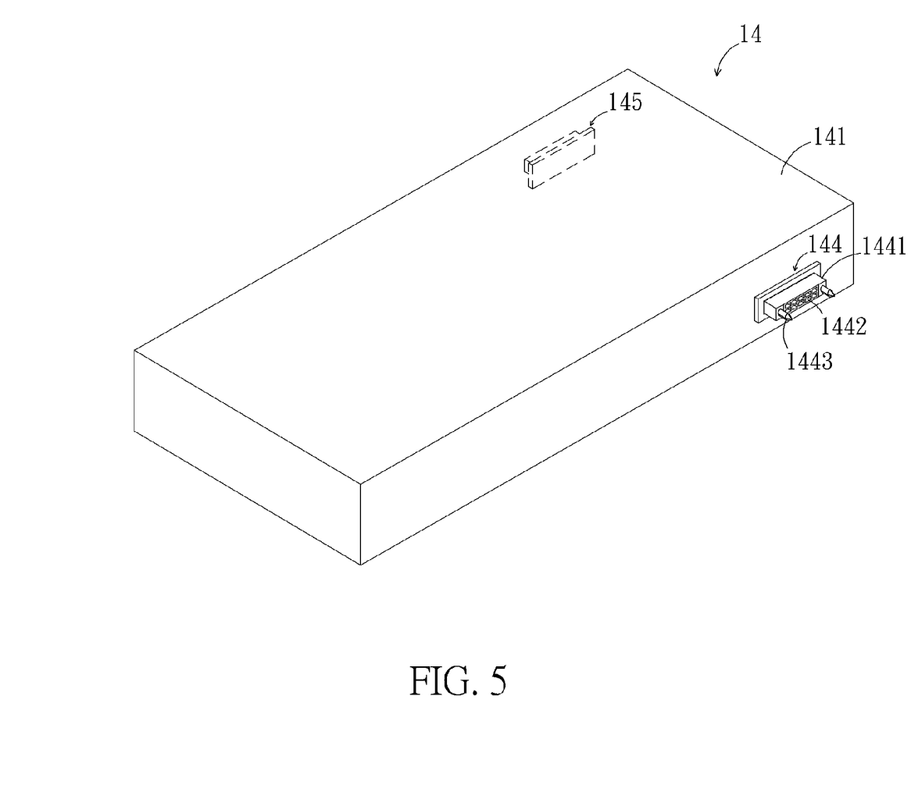
FIG. 5 is a schematic diagram showing an outward appearance of the first swappable battery pack according to another embodiment of the invention.

Besides, please refer to FIG. 5, the first swappable battery pack 14 may also have a second electrical connection unit 145. The second electrical connection unit 145 can be set at the other side relative to the first housing 141 and the first electrical connection unit 144. The second electrical connection unit 145 has the same structure as the first electrical connector 15, it can be used for connecting to a first electrical connection unit of a second swappable battery pack, so as to make the first swappable battery pack 14 and the second swappable battery pack to form an electrical series structure.

It is to be noted, under general condition, the capacity of main battery pack is greater than the capacity of swappable battery pack (the maximum power capacity of battery charge and discharge), so that the main battery pack is able to handle the demand of providing instant high power, such as climbing acceleration or jack-rabbit start that needs greater torsion. Also for this reason, the preceding electric vehicle 1 is mainly provided of power by the main battery pack 11, and the first swappable battery pack 14 will cooperate with the main battery pack 11 to provide power to drive electric vehicle 1 to travel when the electric vehicle 1 is overloaded. When the installing of electric vehicle 1 is small, the first swappable battery pack 14 will charge the main battery pack 11 to maintain the power of main battery pack 11. However, when the first swappable battery pack 14 is also running out of power, it must be replaced, at this moment, the electric vehicle 1 may travel to the nearby power supply station to replace the swappable battery pack.

Figure 6:
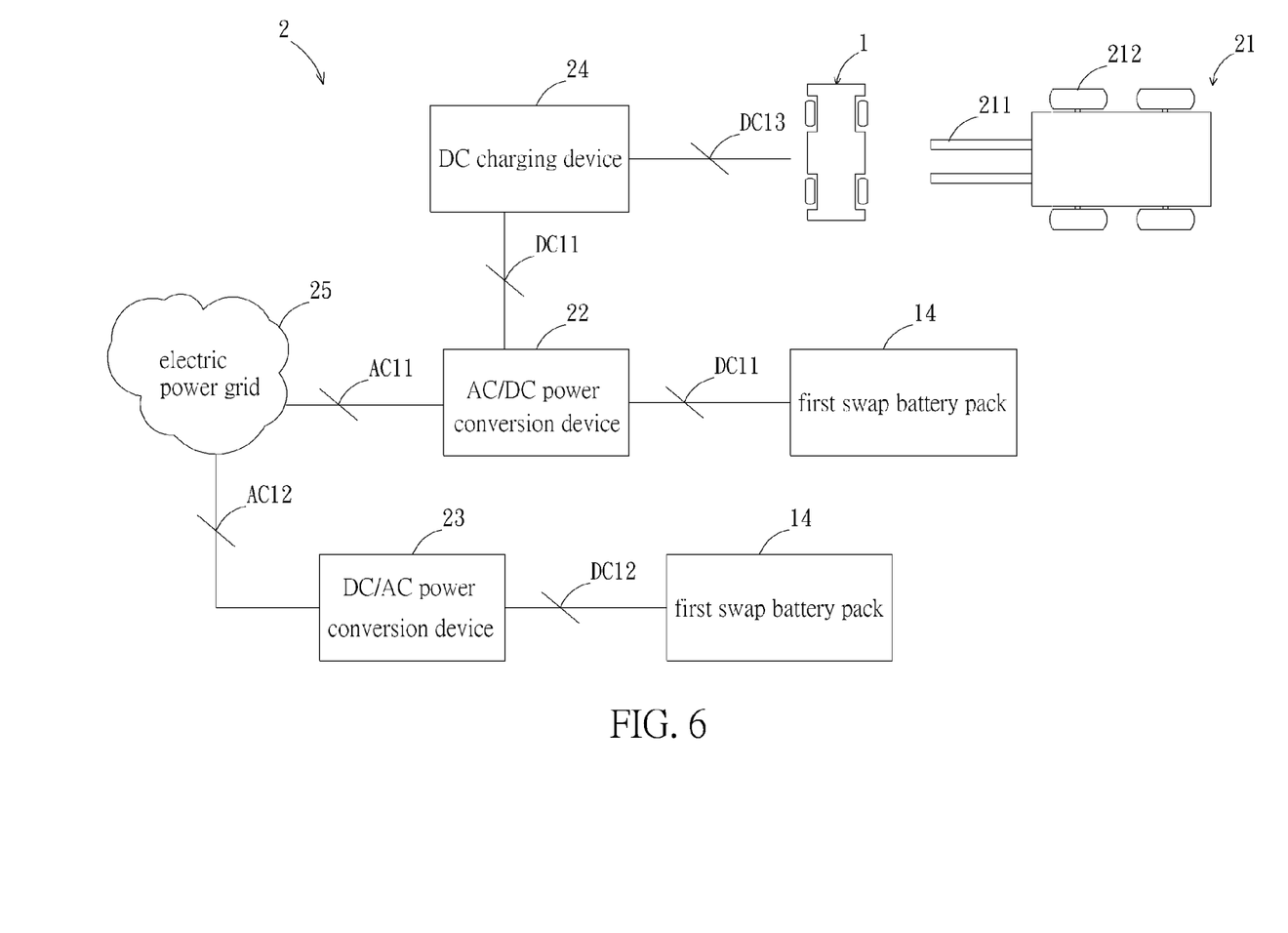
FIG. 6 is a structure schematic diagram showing a power supply station according to an embodiment of the invention.

Then, please refer to the above statements and FIG. 6, it is a structure schematic diagram of power supply station 2 according to the embodiment of the invention. The power supply station 2 can be provided to the electric vehicle 1 mentioned above to carry out power maintenance operation. The so-called power maintenance operation means maintaining the power of the main battery pack 11, hence it can directly charge the main battery pack 11 through the DC recharge socket 12, and replace the swappable battery pack running out of power with the one full of power, and then charge the main battery pack 11.

The power supply station 2 stores a plurality of swappable battery packs, and at least includes a swappable battery pack installing and uninstalling device 21, an AC/DC power conversion device 22, a DC/AC power conversion device 23 and a DC charging device 24.

The swappable battery pack installing and uninstalling device 21 is used for uninstalling the first swappable battery pack 14 from the electric vehicle 1, and then among such swappable battery packs stored, installing a second swappable battery pack to the electric vehicle 1 through the swappable battery pack installing and uninstalling device 21. In the embodiment, the swappable battery pack installing and uninstalling device 21 includes a clamping bearing mechanism 211 and a mobile mechanism 212. The clamping bearing mechanism 211 can fix the swappable battery pack, and extract it from the electric vehicle 1 or install it to the electric vehicle 1. The mobile mechanism 212 can drive the swappable battery pack installing and uninstalling device 21 to move between the storage location of the swappable battery pack and the electric vehicle 1. Besides, since the weight of the swappable battery pack is approximately between 50 kg to 150 kg, comparing with the weight of main battery pack mostly between 250 kg to 600 kg, upon replacement operation, it can input part manpower to supersede the full automatic replacement equipment, in this way it can also reduce the cost expenditure of full automatic equipment.

The AC/DC power conversion device 22 outputs a first DC power DC11 according to a first AC power AC11 to provide to the first swappable battery pack 14 running out of power to carry out the charging procedure. The first AC power AC11 is the commercial power obtained from the electric power grid 25.

Many swappable battery packs will be stored in the power supply station 2, and during the peak time of power consumption, the power supply station 2 can be utilized according to the swappable battery pack already charged. In the embodiment, after the first swappable battery pack 14 is charged, it can be electrically connected to the DC/AC power conversion device 23, and the DC/AC power conversion device 23 is further electrically connected to the electric power grid 25. The DC/AC power conversion device 23 converts a second DC power DC12 output from the first swappable battery pack into a second AC power AC12 to output to the electric power grid 25. In other words, the power supply station 2 can feed back the power generated from the DC/AC power conversion device 23 to the electric power grid, which is equivalent to selling the power to electric power company. Besides, the swappable battery pack already declined can be used for generating the second AC power AC12 to output to the electric power grid. In respect of decline, if the swappable battery pack fully charged only reaches to below 80% of the rated capacity, it is no longer suitable for installing to the electric vehicle, but it can be reutilized.

The DC charging device 24 is used for electrical connection for the DC recharge socket 12 of the electric vehicle 1, and outputs a third DC power DC13 to provide to the main battery pack 11 of the electric vehicle 1 for quick charging. The DC charging device 24 is conforming to including but not limited to at least one of the specifications of CHAdeMO, GB/T 20234, SAE J1772 Combo and IEC 62196 Combo.

Figure 6A:
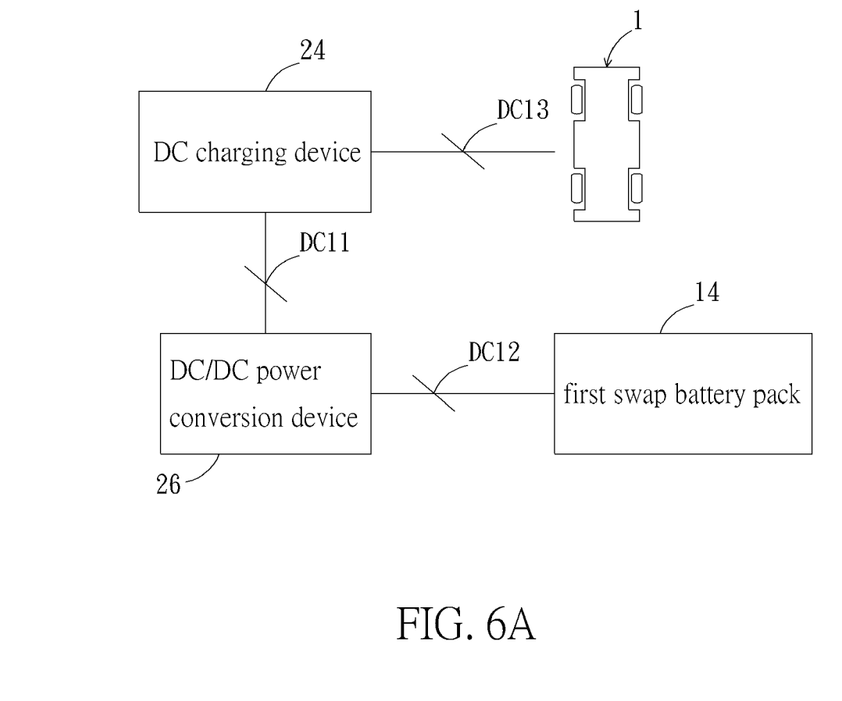
FIG. 6A is the structure schematic diagram showing of a part of the power supply station according to the another embodiment of the invention.

In the embodiment, the power source of the DC charging device 24 can be the first DC power DC11 output from the AC/DC power conversion device 22. In other embodiments, as shown in FIG. 6A, the power source of the DC charging device 24 can be a DC/DC power conversion device 26. The DC/DC power conversion device 26 can be electrically connected to the first swappable battery pack 14 already charged and the DC charging device 24 respectively, and convert the second DC power DC12 output from the first swappable battery pack into the first DC power DC11 needed by the DC charging device 24. Finally, the DC charging device 24 will generate the third DC power DC13 according to the first DC power DC11 and output it to the electric vehicle 1.

Figure 7:
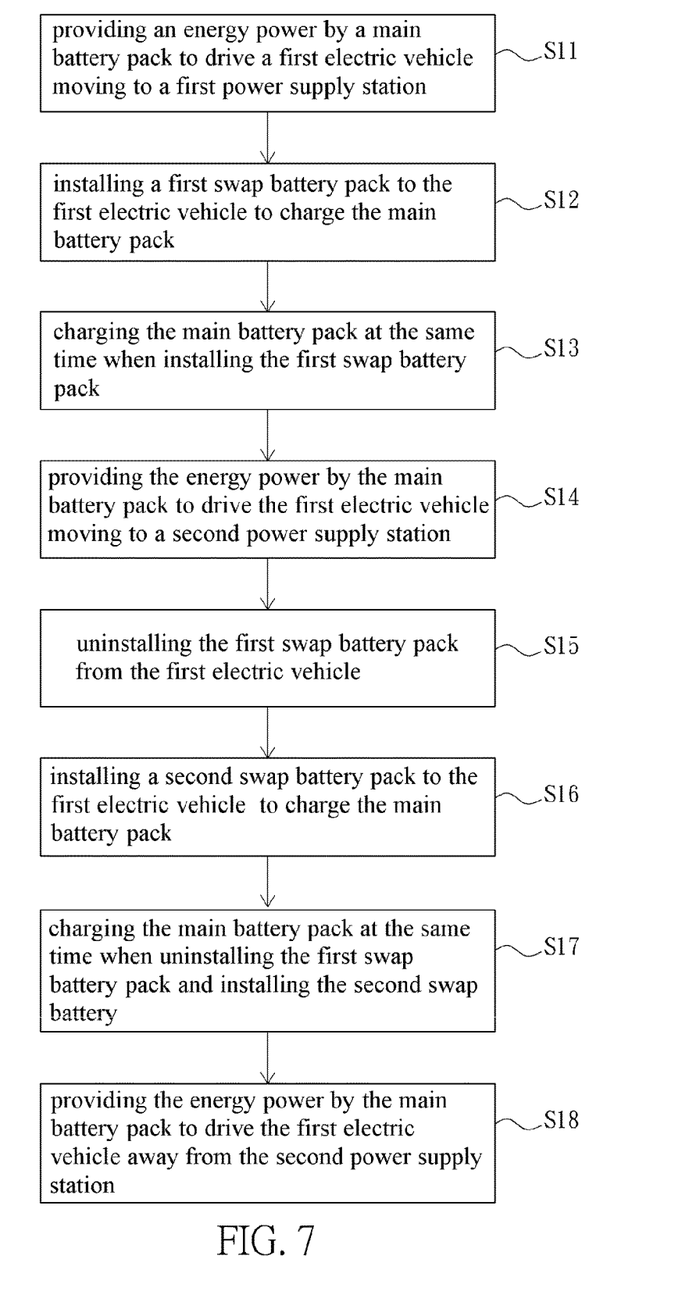
FIG. 7 is a flow chart showing a power maintaining method of an electric vehicle according to an embodiment of the invention.

Then, as shown in FIG. 7, it describes, from the perspective of electric vehicle, the power maintaining method of an electric vehicle according to the embodiment of the invention. As shown in FIG. 7, the power maintaining method of the electric vehicle includes the following steps.

Step S11: a main battery pack provides the energy to drive a first electric vehicle to a first power supply station. The energy provided by the main battery pack drives the electric vehicle through a voltage output bus bar.

Step S12: at the first power supply station, install a first swappable battery pack to a swappable battery holding battery pack holding space of the first electric vehicle, and make electrical connection between the first swappable battery pack and the main battery pack, so as to charge the main battery pack of the first electric vehicle.

Step S13: at the same time when installing the first swappable battery pack, at the first power supply station, electrically connect a DC charging device to the main battery pack to charge the main battery pack. The charging of main battery pack by the DC charging device is conforming to including but not limited to at least one of the specifications of CHAdeMO, GB/T 20234, SAE J1772 Combo and IEC 62196 Combo. The electric current of the DC charging device for charging the main battery pack is 3 times greater than the nominal capacity of main battery pack.

Step S14: after the first swappable battery pack has been installed to the first electric vehicle, the main battery pack provides the power to drive the first electric vehicle to a second power supply station.

Step S15: at the second power supply station, uninstall the first swappable battery pack from the first electric vehicle.

Step S16: at the second power supply station, install a second swappable battery pack to the first electric vehicle, and make electrical connection between the second swappable battery pack and the main battery pack, so as to charge the main battery pack of the first electric vehicle. The first swappable battery pack and the second swappable battery pack have the same outward appearance, but the capacity can be different. It is to be noted, the so-called same outward appearance is meaning that the first swappable battery and the second swappable battery can be placed into the same swappable battery pack holding space, or meaning the connecting terminal of the first swappable battery is compatible with the connecting terminal of the second swappable battery, wherein the connecting terminal is used for communicating to external device. In other words, the connecting terminal of the first swappable battery and the connecting terminal of the second swappable battery have the pins with the same amount or the same configuration.

Step S17: at the same time when uninstalling the first swappable battery pack and installing the second swappable battery pack, at the second power supply station, electrically connect a DC charging device to the main battery pack to charge the main battery pack. The same as the statement above, the charging of main battery pack by DC charging device is conforming to including but not limited to at least one of the specifications of CHAdeMO, GB/T 20234, SAE J1772 Combo and IEC 62196 Combo. The electric current of the DC charging device for charging the main battery pack is 3 times greater than the nominal capacity of the main battery pack.

Step S18: after the second swappable battery pack has been installed, the main battery pack provides the energy to drive the first electric vehicle away from the second power supply station. In the embodiment, the first power supply station and the second power supply station can be the same power supply station or different power supply stations, it is not limited in the embodiment.

As mentioned above, the electric vehicle is mainly provided of energy from main battery pack to drive the electric vehicle, the swappable battery pack mainly charges the main battery pack, when the power of the main battery pack and the swappable battery pack is consumed to a certain low level, the electric vehicle can go to the nearby power supply station to replace the swappable battery pack, so as to maintain the power level of the main battery pack. Besides, when replacing the swappable battery pack of the electric vehicle, the power supply station can utilize the DC charging device to charge the main battery pack at the same time. Through this, it can avoid circumstance that the main battery pack is still at low power status and cannot provide instant high power when the electric vehicle needs instant high power after replacing the swappable battery pack.

Figure 8:
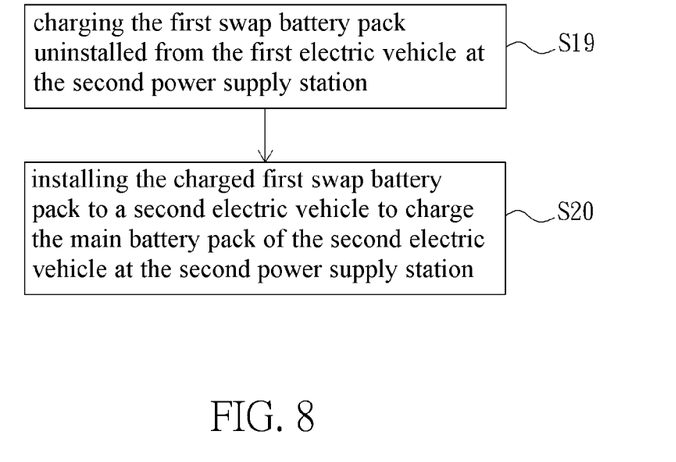
FIG. 8 is a flow chart showing another power maintaining method of an electric vehicle according to the embodiment of the invention.

Please refer to FIG. 8 for the following contents, it will continue the steps mentioned above to further describe the power maintaining method of the electric vehicle from the perspective of power supply station. As shown in FIG. 8, the power maintaining method also includes the following steps.

Step S19: at the second power supply station, charge the first swappable battery pack uninstalled from the first electric vehicle. In the embodiment, the first swappable battery pack has a DC power conversion unit (Converter) and a plurality of batteries, which are electrically connected to each other. A DC charging device of the second power supply station is electrically connected to the DC power conversion unit, and charges such battery through DC power conversion unit. In another embodiment, the DC charging device of the second power supply station is electrically connected to such battery directly, and charges such battery directly. In other words, for the charging operation of charging unit to the swappable battery pack, apart from charging such battery through DC power conversion unit, it can also charge such battery directly without going through DC power conversion unit.

Step S20: at the second power supply station, install the charged first swappable battery pack to a second electric vehicle. And make electrical connection between the first swappable battery pack and the main battery pack of the second electric vehicle, so as to charge the main battery pack of the second electric vehicle.

In summary, as far as electric vehicle is concerned, the electric vehicle can accept the swappable battery pack of different capacity to charge its main battery pack, and after charging the used swappable battery pack, it can also be provided to different electric vehicles, which may have the different main battery pack for use. The so-called different main battery pack is meaning that at least one of the outward appearance, capacity and rated power of the main battery pack is different. The charging of main battery pack through the swappable battery pack will be able to prolong the traveling distance and service time of the electric vehicle. And as far as power supply station is concerned, the power supply station can provide the electric vehicle an operation space for replacing the swappable battery pack, and at the same time of replacing the swappable battery pack, the power supply station can utilize the DC charging device to carry out basic charging to the main battery pack, so that the main battery pack is able to maintain a certain degree of energy, so as to prolong the life of the main battery pack. Besides, apart from providing power to the electric vehicle, the power supply station can also carry out power exchange through the stored swappable battery pack, so as to convert DC power to AC power, and transmit it to electric power grid to sell it to the electric power company.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A power maintaining method for electric vehicles that is applied with at least a first electric vehicle and a first power supply station, the first electric vehicle has a main battery pack, at least one swappable battery pack holding space and a DC recharge socket, the main battery pack is solidly combined with a body structure of the first electric vehicle and there is a connector disposed in the swappable battery pack holding space used for electrically connecting the swappable battery pack to the main battery pack, the first power supply station has a swappable battery pack installing and uninstalling device, a first DC charging device and is able to provide a plurality of swappable battery packs, the method comprising:

installing a first swappable battery pack, which is integrated with a DC power converter, into the swappable battery holding space of the first electric vehicle at the first power supply station, wherein an outward size and appearance of the first swappable battery pack is different from an outward size and appearance of the main battery pack, the first swappable battery pack is able to charge the main battery pack through the DC power converter;

electrically connecting the first DC charging device to the DC recharge socket to charge the main battery pack while installing the first swappable battery pack;

uninstalling the first swappable battery pack from the first electric vehicle at the second power supply station, which has a second DC charging device, a second swappable battery pack installing and uninstalling device and another plurality of swappable battery packs; and installing a second swappable battery pack, which is integrated with a DC power converter, into the swappable battery pack holding space of the first electric vehicle, wherein the capacity of the first swappable battery pack is different from the capacity of the second swappable battery pack.

2. The power maintaining method defined in claim 1, further comprising:

electrically connecting the second DC charging device to the main battery pack to charge the main battery pack while uninstalling the first swappable battery pack at the second power supply station.

3. The power maintaining method defined in claim 2, further comprising:

charging the first swappable battery pack, which is uninstalled from the first electric vehicle, at the second power supply station; and installing the first swappable battery pack, which is already charged, into a swappable battery pack holding space of a second electric vehicle, wherein the outward size and appearance of the first swappable battery pack is different from the outward size and appearance of a main battery pack of the second electric vehicle.

4. The power maintaining method defined in claim 1, wherein the electric current of the first DC charging device for charging the main battery pack is 3 times greater than the nominal capacity of the main battery pack.

5. The power maintaining method defined in claim 3, wherein the first swappable battery pack further has a plurality of batteries, which are electrically connected to each other, the second DC charging device of the second power supply station is electrically connected to the switched mode DC power converter which is internal to the first swappable battery pack to charge the batteries through the DC power converter.

6. A power maintaining method for electric vehicles that is applied with at least a first electric vehicle, a first power supply station and a second power supply station, the first electric vehicle has a main battery pack, at least one swappable battery pack holding space and a DC recharge socket, the main battery pack is solidly combined with a body structure of the first electric vehicle and there is a connector disposed in the swappable battery pack holding space used for electrically connecting the swappable battery pack to the main battery pack, the first power supply station has a first swappable battery pack installing and uninstalling device, a first DC charging device and is able to provide a plurality of swappable battery packs, the second power supply station has a second DC charging device, a second swappable battery pack installing and uninstalling device and another plurality of swappable battery packs, the method comprising:

installing a first swappable battery pack, which is integrated with a DC power converter, into the swappable battery pack holding space of the first electric vehicle at the first power supply station, wherein an outward size and appearance of the first swappable battery is different from an outward size and appearance of the main battery pack, the first swappable battery pack is able to charge the main battery pack of the first electric vehicle through the DC power converter;

electrically connecting the first DC charging device to the DC recharge socket to charge the main battery pack while installing the first swappable battery pack at the first power supply station;

uninstalling the first swappable battery pack from the first electric vehicle at the second power supply station;

charging the first swappable battery pack, which is uninstalled from the first electric vehicle, at the second power supply station; and installing the first swappable battery pack, which is already charged, into a swappable battery pack holding space of the second electric vehicle at the second power supply station, wherein the capacity of the main battery pack of the first electric vehicle is different from the capacity of the main battery pack of the second electric vehicle, and the first swappable battery pack is able to charge the main battery pack of the second electric vehicle through the DC power converter.

7. The power maintaining method defined in claim 6, wherein the first swappable battery pack further has a plurality of batteries, which are electrically connected to each other, the second DC charging device of the second power supply station is electrically connected to the DC power converter which is internal to the first swappable battery pack to charge the batteries through the DC power converter.

8. The power maintaining method defined in claim 3, wherein the first swappable battery pack further comprises a plurality of batteries electrically connected to each other, and wherein the second DC charging device of the second power supply station is electrically connected to the batteries to directly charge the batteries.

* * * * *